United States Patent
Varanasi et al.

(10) Patent No.: US 11,772,463 B2
(45) Date of Patent: *Oct. 3, 2023

(54) WINDOW ASSEMBLY

(71) Applicant: Pilkington Group Limited, Lathom (GB)

(72) Inventors: Srikanth Varanasi, Ottawa Hills, OH (US); Martin James Horsley, Helsby (GB); James Eckhart, Lambertville, MI (US)

(73) Assignee: Pilkington Group Limited, Lathom (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/702,918

(22) Filed: Mar. 24, 2022

(65) Prior Publication Data
US 2022/0212524 A1 Jul. 7, 2022

Related U.S. Application Data

(63) Continuation of application No. 16/632,887, filed as application No. PCT/GB2018/052123 on Jul. 27, 2018, now Pat. No. 11,299,018.
(Continued)

(51) Int. Cl.
*B60J 3/00* (2006.01)
*B32B 17/10* (2006.01)
(Continued)

(52) U.S. Cl.
CPC ............... *B60J 3/007* (2013.01); *B32B 7/02* (2013.01); *B32B 17/10036* (2013.01);
(Continued)

(58) Field of Classification Search
CPC ......... B32B 17/00–17/1099; B32B 7/00–7/14; C03C 3/083–3/085; C03C 3/087
See application file for complete search history.

(56) References Cited

U.S. PATENT DOCUMENTS 3,592,726 A 7/1971 Blizard
3,639,198 A 2/1972 Plumat et al.
(Continued)

FOREIGN PATENT DOCUMENTS

EP 2517877 B1 10/2012
EP 2985267 A1 2/2016
(Continued)

OTHER PUBLICATIONS

Pilkington, L.A.B. "Review Lecture. The Float Glass Process", Proceedings of the Royal Society of London. Seris A, Mathematical and Physical Sciences, Dec. 16, 1969, vol. 314, No. 1516 (Dec. 16, 1969); pp. 1-25.
(Continued)

*Primary Examiner* — Prashant J Khatri
(74) *Attorney, Agent, or Firm* — Marshall & Melhorn, LLC

(57) ABSTRACT

A window assembly includes a first pane of glass. The first pane of glass is chemically strengthened and exhibits a surface compressive stress of 400 MPa or more. A second pane of glass has a first major surface and a second major surface. The second major surface of the second pane of glass and a first major surface of the first pane of glass face each other. The second pane of glass includes 68-74 weight % $SiO_2$, 2-6 weight % MgO, 1-10 weight % CaO, 12-16 weight % $Na_2O$, 0-1 weight % $K_2O$, 0.8-2.0 weight % $Fe_2O_3$ (total iron), 0-1.25 weight % $TiO_2$, and 0-1.25 weight % $CeO_2$. A polymeric interlayer is provided between the first pane of glass and the second pane of glass. The window assembly exhibits a direct solar transmittance of 55% or less and a total solar transmittance of 65% or less.

20 Claims, 3 Drawing Sheets

Related U.S. Application Data

(60) Provisional application No. 62/538,167, filed on Jul. 28, 2017.

(51) Int. Cl.
    *B60J 1/00*           (2006.01)
    *E06B 3/66*          (2006.01)
    *E06B 3/67*          (2006.01)
    *E06B 9/24*          (2006.01)
    *B32B 7/02*          (2019.01)

(52) U.S. Cl.
CPC ......... *B32B 17/10339* (2013.01); *B60J 1/001* (2013.01); *E06B 3/6608* (2013.01); *E06B 3/6715* (2013.01); *E06B 9/24* (2013.01); *E06B 2009/2417* (2013.01)

(56) References Cited

U.S. PATENT DOCUMENTS

| | | |
|---|---|---|
| 4,985,099 A | 1/1991 | Mertens et al. |
| 5,214,008 A | 5/1993 | Beckwith et al. |
| 6,333,285 B1 | 12/2001 | Vitrage |
| 6,518,211 B1 | 2/2003 | Bradshaw et al. |
| 8,828,898 B2 | 9/2014 | Arai et al. |
| 9,174,867 B2 | 11/2015 | Arai et al. |
| 9,375,900 B2 | 6/2016 | Tsuchiya et al. |
| 9,764,980 B2 | 9/2017 | Senshu et al. |
| 9,919,496 B2 | 3/2018 | Michetti et al. |
| 10,486,369 B2 | 11/2019 | Michetti et al. |
| 2012/0250146 A1 | 10/2012 | Tamai et al. |
| 2014/0141206 A1 | 5/2014 | Gillard et al. |
| 2016/0136929 A1 | 5/2016 | Meiss et al. |
| 2017/0015180 A1 | 1/2017 | Sakamoto et al. |
| 2018/0141850 A1 | 5/2018 | Dejneka et al. |
| 2018/0370843 A1 | 12/2018 | Gross et al. |

FOREIGN PATENT DOCUMENTS

| | | | |
|---|---|---|---|
| GB | 1275653 A | 5/1972 | |
| GB | 2011316 A | 7/1979 | |
| GB | 2221424 A | 2/1990 | |
| JP | 2004123495 A | 4/2004 | |
| JP | 5880439 B2 | 3/2016 | |
| WO | 9628394 A1 | 9/1996 | |
| WO | WO-9730948 A1 * | 8/1997 | ............ C03C 3/087 |
| WO | 2008149093 A1 | 12/2008 | |
| WO | 2013/004473 A1 | 1/2013 | |
| WO | 2015/006201 A1 | 1/2015 | |
| WO | 2015/092385 A1 | 6/2015 | |
| WO | 2015/137518 A1 | 9/2015 | |
| WO | 2015/150207 A1 | 10/2015 | |
| WO | 2016169823 A1 | 10/2016 | |
| WO | 2015137518 A1 | 4/2017 | |
| WO | 2017103471 A1 | 6/2017 | |
| WO | 2018/098135 A1 | 5/2018 | |

OTHER PUBLICATIONS

Proposed Regulation Order, Cool Car Standards and Test Procedures—2012 and Subsequent Model-Year Passenger Cares, Light Duty Trucks, and Medium-Duty Vehicles, State of California, released on May 8, 2009.

C.R. Bamford, "Colour Generation and Control in Glass", Glass Science and Technology, 2, Elseveir Scientific Publishing Company, 1977, pp. 35-36 and 145-146.

Milos B. Volf, "Chemical Approach to Glass", Glass Science and Technology, 7, Elsevier, 1984, pp. 347-350.

* cited by examiner

WINDOW ASSEMBLY

BACKGROUND OF THE INVENTION

The invention relates to a window assembly. More particularly, the invention relates to window assembly for use in a vehicle.

The windows of a vehicle are a prominent feature of the overall design of the vehicle. Among other important functions, the windows of a vehicle help to control the solar gain into the vehicle that occurs in hot weather and protect the passengers of the vehicle from road debris. There is often a balance that must be achieved between the appearance and the functional properties, such as, for example, solar control and impact resistance, of said windows.

It would be desirable to provide a window assembly, which could be used as a windshield or another window in the vehicle, that has a pleasant appearance and is lightweight, has excellent solar control properties, and has a high impact resistance.

SUMMARY OF THE INVENTION

Embodiments of a window assembly are described below. In an embodiment, the window assembly comprises a first pane of glass. The first pane of glass is chemically strengthened and exhibits a surface compressive stress of 400 MPa or more. A second pane of glass having a first major surface and a second major surface is provided. The second major surface of the second pane of glass and a first major surface of the first pane of glass face each other. The second pane of glass comprises 68-74 weight % $SiO_2$, 2-6 weight % MgO, 1-10 weight % CaO, 12-16 weight % $Na_2O$, 0-1 weight % $K_2O$, 0.8-2.0 weight % $Fe_2O_3$ (total iron), 0-1.25 weight % $TiO_2$, and 0-1.25 weight % $CeO_2$. A polymeric interlayer is provided between the first pane of glass and the second pane of glass. The window assembly exhibits a direct solar transmittance, integrated over the wavelength range 300 to 2500 nm according to the relative solar spectral distribution for air mass 1.5, of 55% or less and a total solar transmittance, integrated over the wavelength range 300 to 2500 nm according to the relative solar spectral distribution for air mass 1.5, of 65% or less.

Preferably, the first pane of glass is an inner pane of glass.
Preferably, the first pane of glass is a sheet of float glass.
Preferably, the first pane of glass exhibits a surface compressive stress of 450 MPa or more.
Preferably the first pane of glass exhibits a surface compressive stress of 600 MPa or more.
Preferably, the first pane of glass exhibits a surface compressive stress of 600-1,000 MPa.
Preferably, the second pane of glass is an outer pane of glass.
Preferably, the second pane of glass is a sheet of float glass.
Preferably, the thickness of the second pane of glass is greater than the thickness of the first pane of glass, more preferably the thickness of the second pane of glass is at least 1.5 times greater than the thickness of the first pane of glass.
Preferably, the thickness of the second pane of glass is 4 mm or less and the thickness of the first pane of glass is 2 mm or less.
Preferably, the second pane of glass comprises 0.8-1.9 weight % $Fe_2O_3$ (total iron), more preferably 0.9-1.9 weight % $Fe_2O_3$ (total iron), even more preferably 0.9-1.4 weight % $Fe_2O_3$ (total iron).
Preferably, the second pane of glass comprises 0.01-0.3 weight % $TiO_2$.
Preferably, the second pane of glass is substantially $Co_3O_4$ free.
Preferably, the first pane of glass comprises $Al_2O_3$.
Preferably, the second pane of glass comprises $Al_2O_3$.
Preferably, the second pane of glass comprises 0-2 weight % $Al_2O_3$.
Preferably, the weight % of $Al_2O_3$ in the second pane of glass is less than the weight % of $Al_2O_3$ in the first pane of glass.
Preferably, the window assembly exhibits a total visible light transmittance (Illuminant A, two degree observer) of 70% or more as measured from a side facing the first pane of glass.
Preferably, the transmitted color (Illuminant D65, ten degree observer) exhibited by the window assembly is of a green-yellow color.
Preferably, the transmitted color (Illuminant D65, ten degree observer) exhibited by the window assembly has a* value of −12 to −5 and a b* value of 0 to 6.
Preferably, the window assembly has a thickness of less than 5.0 mm. More preferably, the thickness of the window assembly is between 2.0 and 5.0 mm.
In some embodiments, the first pane of glass comprises 66-72 weight % $SiO_2$, 8-15 weight % MgO, 1-8 weight % CaO, 12-16 weight % $Na_2O$, 0-1 weight % $K_2O$, and 1.0-5.0 weight % $Al_2O_3$. Preferably the first pane of glass comprises 4.0-5.0 weight % $Al_2O_3$.
In some embodiments, the first pane of glass comprises 58-70 weight % $SiO_2$, 4-10 weight % MgO, 0-1 weight % CaO, 12-18 weight % $Na_2O$, 0.1-5 weight % $K_2O$, and 5-15 weight % $Al_2O_3$.
In some embodiments, the window assembly exhibits a direct solar transmittance of 52% or less. Preferably, the window assembly exhibits a direct solar transmittance of 40-55%.
In some embodiments, the window assembly exhibits a total solar transmittance of 62% or less. Preferably, the window assembly exhibits a total solar transmittance of 55-65%.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE INVENTION

Figure 1:
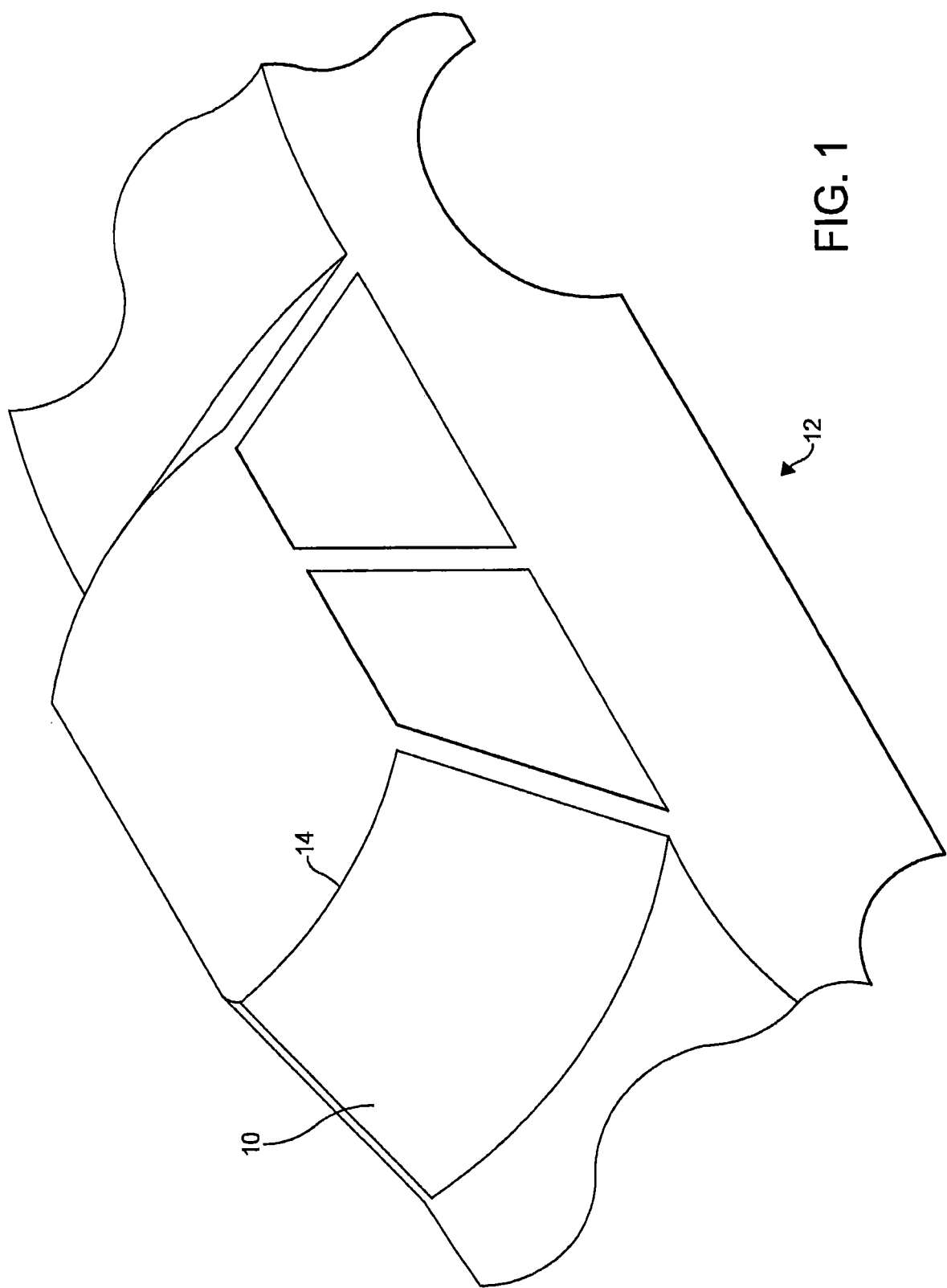
FIG. 1 is a partial perspective view of a vehicle depicting a window assembly in accordance with the invention.

It is to be understood that the invention may assume various alternative orientations and step sequences, except where expressly specified to the contrary. It is also to be understood that the specific articles, assemblies and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 2:
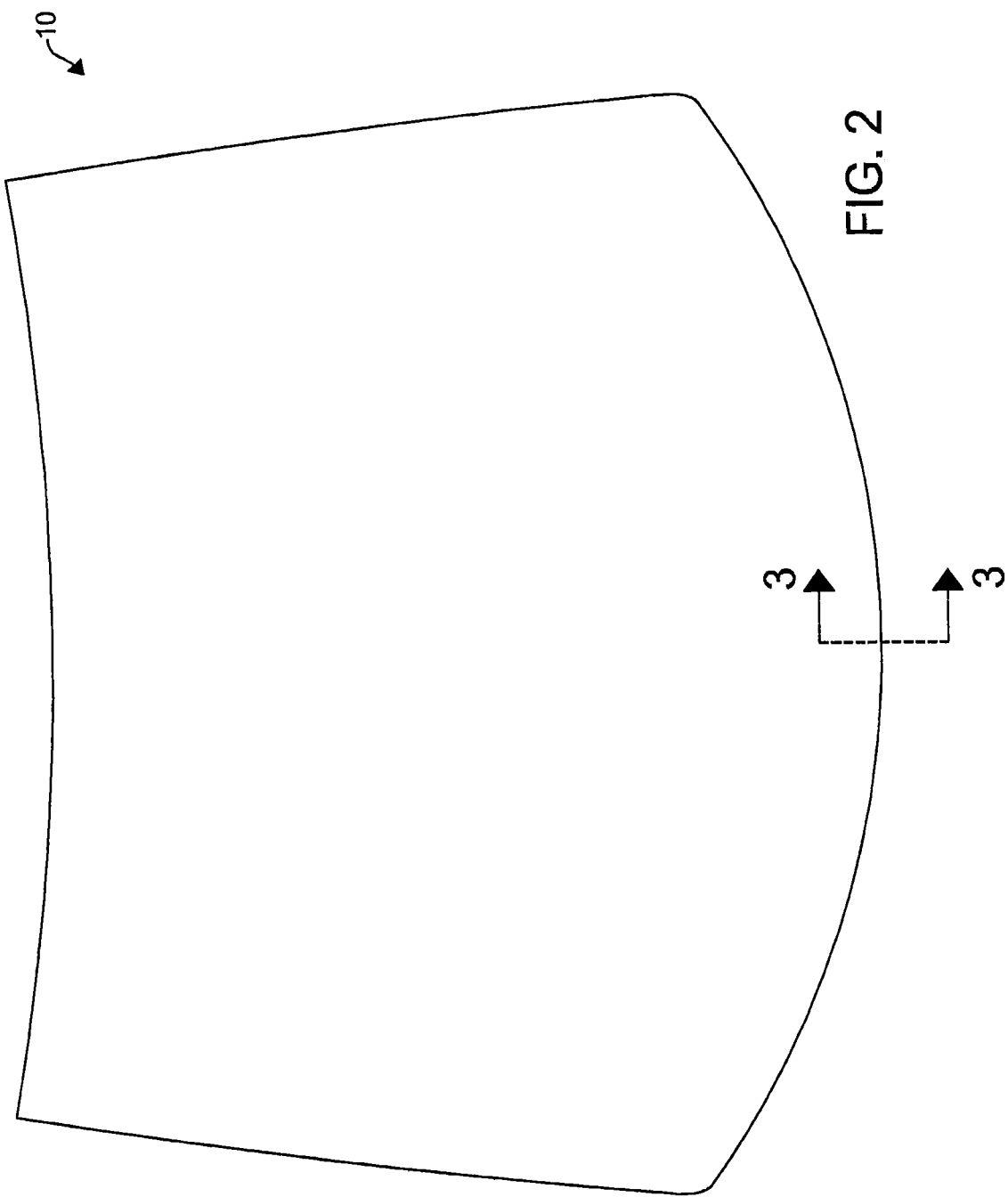
FIG. 2 is a front view of the window assembly of FIG. 1.
Figure 3:
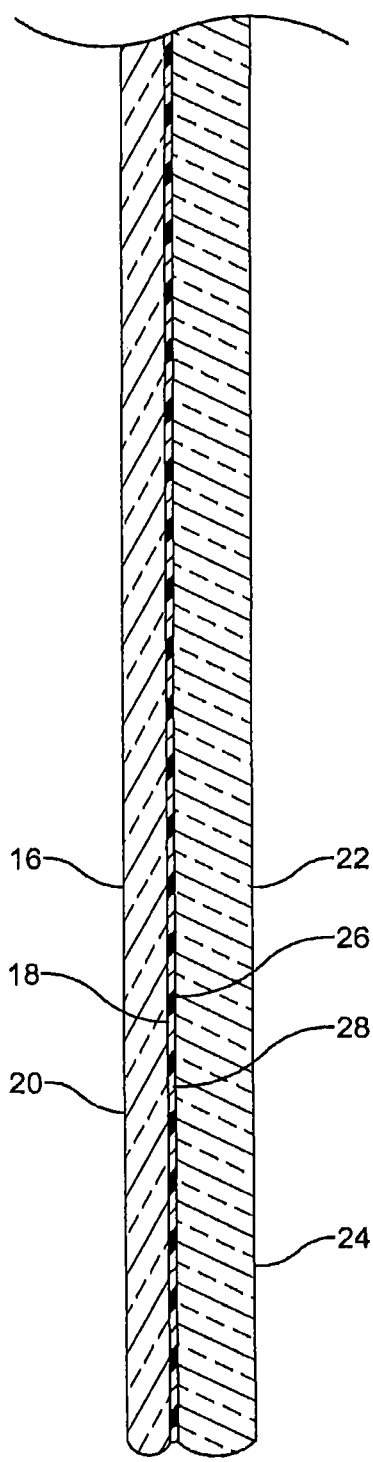
FIG. 3 is a sectional view of the portion of the window of FIG. 2 taken along line 3-3.

A window assembly 10 is illustrated in the FIGS. 1-3. The window assembly 10 will be described in connection with a vehicle 12, which is illustrated in FIG. 1. It would be understood by one of ordinary skill in the art that the assembly described herein may have applications to on-highway and off-highway vehicles. Furthermore, it would be understood by one of ordinary skill in the art that the present invention could have industrial, locomotive, naval, aerospace, and other applications.

Preferably, the window assembly 10 is installed in a body opening 14 of the vehicle 12 so as to be the front window or windshield of the vehicle 12. However, it should be appreciated that the window assembly 10 could be utilized in another body opening in the vehicle 12 such as, for example, in a side or rear opening of the vehicle 12. In these embodiments (not depicted), the window assembly is a back lite or side lite of the vehicle. In other embodiments (not depicted), the window assembly could be utilized in another body opening in the vehicle. For example, the window assembly 10 could be installed in an opening in the roof of the vehicle 12. In this embodiment, the window assembly 10 is a roof lite of the vehicle 12.

The window assembly 10 comprises an inner pane of glass 16. The inner pane of glass 16 may be referred to herein as the first pane of glass. The inner pane of glass 16 may be formed using a float glass manufacturing process and provided as a sheet of glass. As best illustrated in FIG. 3, the inner pane of glass 16 has a first major surface 18 and a second major surface 20. Preferably, the first major surface 18 and the second major surface 20 are provided in a parallel relationship with each other. In some embodiments, the first major surface 18 may face a major surface 26 of an outer pane of glass 22. In these embodiments, the second major surface 20 of the inner pane of glass 16 may face the passenger compartment of the vehicle 12 when the window assembly 10 is installed.

Preferably, the inner pane of glass 16 is a clear soda-lime-silica glass. In one such embodiment, the inner pane of glass 16 has a low iron content, which allows for high visible light transmittance. For example, the inner pane of glass 16 may comprise 0.15 weight % $Fe_2O_3$ (total iron) or less. As used herein, the phrase "total iron" refers to the total weight of iron oxide ($FeO+Fe_2O_3$) contained in the glass. More preferably, the inner pane of glass 16 comprises 0.1 weight % $Fe_2O_3$ (total iron) or less, and, even more preferably, a 0.02 weight % $Fe_2O_3$ (total iron) or less. In an embodiment, the inner pane of glass 16 comprises 0.012 weight % $Fe_2O_3$ (total iron). In these embodiments, the inner pane of glass 16 may exhibit a total visible light transmittance of 91% or more in the CIELAB color scale system (Illuminant A, two degree observer).

In other embodiments, the inner pane of glass 16 comprises 58-72 weight % $SiO_2$, 4-15 weight % MgO, 0-8 weight % CaO, 12-18 weight % $Na_2O$, and 0-5 weight % $K_2O$. In these embodiments, the inner pane of glass 16 may comprise 1.0 weight % alumina ($Al_2O_3$) or more and also have 0-0.3 mass percent $SO_3$. In one such embodiment, the inner pane of glass 16 comprises 66-72 weight % $SiO_2$, 8-15 weight % MgO, 1-8 weight % CaO, 12-16 weight % $Na_2O$, and 0-1 weight % $K_2O$. In this embodiment, the inner pane of glass 16 has 1.0 weight % or more, but less than 5.0 weight % $Al_2O_3$. Preferably, in this embodiment, the inner pane of glass 16 has 4.0-5.0 weight % $Al_2O_3$. In another embodiment, the inner pane of glass 16 may have 5.0 weight % $Al_2O_3$ or more. In this embodiment, the inner pane of glass 16 may have 5-15 weight % $Al_2O_3$. In this embodiment, the inner pane of glass 16 may also comprise 58-70 weight % $SiO_2$, 4-10 weight % MgO, 0-1 weight % CaO, 12-18 weight % $Na_2O$, and 0.1-5 weight % $K_2O$. It may also be preferred that the composition of the inner pane of glass 16 is boron free in this embodiment. In certain embodiments, the inner pane of glass 16 may be clear float glass. In this embodiment, clear float glass may mean a glass having a composition as defined in BS EN 572-1 and BS EN 572-2 (2012). In still other embodiments, the inner pane of glass 16 may be of another composition such as, for example, a borosilicate composition.

It is preferred that the inner pane of glass 16 is relatively thin when compared to the thickness of the outer pane of glass 22. In an embodiment, the inner pane of glass 16 has a thickness of 2 millimeters (mm) or less. Preferably, the inner pane of glass 16 has a thickness of 1 mm or less. In an embodiment, the inner pane of glass 16 has a thickness of 0.5-1.0 mm. More preferably, the inner pane of glass 16 has a thickness of 0.5-0.8 mm. The thickness of the inner pane of glass 16 helps to reduce the weight of the window assembly 10, which improves the fuel economy of a vehicle or improves the range of the vehicle when it is of the electric variety.

In order for the inner pane of glass 16 to be thin and for the window assembly 10 to still exhibit the desired amount of impact resistance, it is preferred that the inner pane of glass 16 is chemically strengthened. Chemical strengthening processes known in the art are suitable for use with the inner pane of glass 16. Preferably, the chemical strengthening process is of the ion exchange variety and is performed using a molten salt. In one such embodiment, sodium ions in the glass are replaced with monovalent cations having an ionic radius which is larger than that of the sodium ions being replaced. In this embodiment, the monovalent cations may be, for example, potassium ions provided by a molten salt of potassium nitrate or a mixture of potassium nitrate and sodium nitrate. A suitable chemically strengthened glass for use as the inner pane of glass 16 is a sheet of Glanova™ glass, which is manufactured and sold by Nippon Sheet Glass Co. Ltd. However, other chemically strengthened glasses are also suitable for use as the inner pane of glass 16.

After chemical strengthening, it is preferred that the inner pane of glass 16 exhibits a high surface compressive stress. In an embodiment, the inner pane of glass 16 exhibits a surface compressive stress of 400 MPa or more. In another embodiment, the inner pane of glass 16 exhibits a surface compressive stress of 450 MPa or more. In still other embodiments, the inner pane of glass 16 exhibits a surface compressive stress of 600 MPa or more. In these embodiments, the inner pane of glass 16 may exhibit a surface compressive stress of 600-1,000 MPa. Preferably, the inner pane of glass 16 exhibits a surface compressive stress of 600-800 MPa. More preferably, the inner pane of glass 16 exhibits a surface compressive stress of 700-800 MPa. For the embodiments described herein, the surface compressive stress can be measured using a Strainoptics Laser GASP-CS (http://www.strainoptics.com/files/Laser %20GASP-CS %20Quick-Start%20(English).pdf or http://www.strainoptics.com/wp-content/uploads/2017/10/2017-GASP-CS-Quick-Start.pdf). Such equipment is available from Strainoptics, Inc., 108 W. Montgomery Avenue, North Wales, Pa. 19454 USA. For high levels of surface compressive stress, as typically found in chemically strengthened glass and fully thermally toughened soda lime silicate glass, it is known in the art that a differential stress refractometer (DSR) may be used to measure surface compressive stress. Such equipment is available from Gaertner Scientific Corporation, 3650 Jarvis Avenue, Skokie, Ill. 60076 USA.

In certain embodiments, the depth of ion penetration may be 200 microns or more after chemical strengthening. In other embodiments, after chemical strengthening, the inner pane of glass 16 may also include a compressive stress layer having a depth of 15 µm or more. Preferably, the compressive stress layer has a depth of 15-40 µm. More preferably, the compressive stress layer has a depth of 15-25 µm. In another embodiment, the inner pane of glass 16 exhibits a Vickers hardness of 550 kgf/mm$^2$ or more after chemical strengthening.

The window assembly 10 also comprises the outer pane of glass 22. The outer pane of glass 22 may be referred to herein as the second pane of glass. The outer pane of glass 22 may be formed using a float glass manufacturing process and provided as a sheet of float glass. As illustrated best in FIG. 3, the outer pane of glass 22 has a first major surface 24 and a second major surface 26. The first major surface 24 and the second major surface 26 are provided in a parallel relationship with each other. The second major surface 26 of the outer pane of glass 22 and the first major surface 18 of the inner pane of glass 16 face each other and, in certain embodiments, may be in a parallel relationship with each other. In other embodiments (not depicted), the window assembly 10 may be provided for applications such as, for example, use in heads-up display applications, which may require that the second major surface 26 of the outer pane of glass 22 and the first major surface 18 of the inner pane of glass 16 are not provided in a parallel relationship with each other. In these embodiments, the second major surface 26 of the outer pane of glass 22 or the first major surface 18 of the inner pane of glass 16 may be positioned in such a manner that one surface 18, 26 is positioned oblique to the other.

The composition and thickness of the outer pane of glass 22 is selected to allow the window assembly 10 to exhibit certain solar, visible light transmittance, and color properties. Also, it is preferred that the thickness of the outer pane of glass 22 is greater than the thickness of the inner pane of glass 16. Providing the outer pane of glass 22 with a thickness that is greater than the thickness of the inner pane of glass 16 generally provides the window assembly 10 with greater impact resistance when compared to window assemblies having panes of glass with the same thickness. In an embodiment, the outer pane of glass 22 has a thickness which is at least 1.5 times greater than the thickness of the inner pane of glass 16. In another embodiment, the outer pane of glass 22 has a thickness which is at least 2.0 times greater than the thickness of the inner pane of glass 16. In these embodiments, the outer pane of glass 22 has a thickness of 4 mm or less. In some embodiments, the outer pane of glass 22 has a thickness of 1.0-4.0 mm. In other embodiments, the outer pane of glass 22 has a thickness of 1.0-3.0 mm. In still other embodiments, the outer pane of glass 22 has a thickness of 1.2-2.5 mm. Alternatively, in some embodiments, the outer pane of glass 22 has a thickness of 1.8-3.1 mm.

Preferably, the outer pane of glass 22 is a soda-lime-silica glass. However, the outer pane of glass 22 may be of another composition such as, for example, a borosilicate or aluminosilicate composition. It is also preferred that the outer pane of glass 22 is colored. In one such embodiment, the outer pane of glass 22 is of a green-yellow color. The color of the outer pane of glass 22 can vary between embodiments of the window assembly 10.

In order to provide a soda-lime-silica glass that exhibits the desired color, the outer pane of glass 22 comprises 68-74 weight % $SiO_2$, 2-6 weight % MgO, 1-10 weight % CaO, 12-16 weight % $Na_2O$, and 0-1 weight % $K_2O$. In certain embodiments, the CaO in the outer pane of glass is 1-9 weight % and, may be 1-8 weight %. In one such embodiment, the CaO in the outer pane of glass 22 may be 6-8 weight %. The outer pane of glass 22 may also comprise 0-2 weight % $Al_2O_3$. When it is desired to improve the chemical durability of the outer pane of glass, the outer pane of glass 22 may comprise 1-2 weight % $Al_2O_3$. Thus, in certain embodiments, the composition of the outer pane of glass 22 comprises less $Al_2O_3$ than the composition of the inner pane of glass 16.

Additionally, the desired amount of total iron in the outer pane of glass 22 will vary depending on the thickness selected for the outer pane of glass 22. When iron is present in a glass, it can exist in two oxidation states, namely ferrous iron ($Fe^{2+}$) and ferric iron ($Fe^{3+}$). In an embodiment, the total iron may comprise 20-30% ferrous iron calculated as $Fe_2O_3$. It is possible to determine ferrous iron by chemical techniques. Alternatively, the ferrous iron content can be determined by measuring the absorption of the glass at 1000 nm, as this is in the region of the peak absorption due to ferrous iron. It is then possible to determine the ferrous iron content using the well-known Lambert-beer law and an appropriate extinction coefficient for ferrous iron. A method of optically determining the amount of ferrous iron to ferric iron in glass is described by C. R. Bamford in "Colour Control and Generation in Glass," Elsevier (1977).

When the outer pane of glass 22 is thicker, it is preferred that the amount of $Fe_2O_3$ in the outer pane of glass 22 is lower than when the outer pane of glass 22 is thinner. In an embodiment, the outer pane of glass 22 comprises 0.8-2.0 weight % $Fe_2O_3$ (total iron). In another embodiment, the outer pane of glass 22 comprises 0.8-1.9 weight % $Fe_2O_3$ (total iron). Preferably, the outer pane of glass 22 comprises 0.9-1.9 weight % $Fe_2O_3$ (total iron). In some of these embodiments, the outer pane of glass 22 comprises 0.9-1.8 weight % $Fe_2O_3$ (total iron). In other embodiments, the outer pane of glass 22 comprises 0.9-1.4 weight % $Fe_2O_3$ (total iron). Thus, in certain embodiments, the composition of the outer pane of glass 22 comprises an iron content that is higher than that of the inner pane of glass 16.

In certain embodiments, it may be desirable that the window assembly 10 exhibit certain color properties. In these embodiments, the outer pane of glass 22 may comprise $TiO_2$. When the outer pane of glass 22 comprises $TiO_2$, the window assembly 10 may exhibit the desired color properties and block ultraviolet radiation from entering the passenger compartment of the vehicle 12 through the window assembly 10. In an embodiment, the outer pane of glass 22 comprises 0-1.25 weight % $TiO_2$. In another embodiment, the outer pane of glass 22 comprises 0.01-1.25 weight % $TiO_2$. In some embodiments, the outer pane of glass 22 comprises 0-0.3 weight % $TiO_2$. In one such embodiment, the outer pane of glass 22 comprises 0.01-0.3 weight % $TiO_2$. In another embodiment, the outer pane of glass 22 comprises 0.03-0.3 weight % $TiO_2$. In other embodiments, the desired color and ultraviolet radiation blocking properties exhibited by the window assembly 10 may be achieved with the addition of $CeO_2$ to the composition of the outer pane of glass 22. In these embodiments, $CeO_2$ may be used as an alternative to $TiO_2$ or in combination therewith. In an embodiment, the outer pane of glass 22 comprises 0-1.25 weight % $CeO_2$. In another embodiment, the outer pane of glass 22 comprises 0.01-0.5 weight % $CeO_2$.

In certain embodiments, the presence of $Co_3O_4$ in the outer pane of glass 22 is undesirable because it reduces the visible light transmittance and affects the color of the outer pane of glass 22. Thus, due to the desired visible light transmittance and color properties of the window assembly 10, which are described below, it may be preferred that the composition of the outer pane of glass 22 is substantially $Co_3O_4$ free. In these embodiments, the phrase "substantially $Co_3O_4$ free" means that the outer pane of glass 22 comprises 10 parts per million (ppm) $Co_3O_4$ or less. In other embodiments where lower visible light transmission may be desirable, for example in a back lite, rear side lite, or a roof lite, the outer pane of glass may comprise $Co_3O_4$, Se, and other materials that can be utilized as a colorant to provide the outer pane of glass with suitably low visible light transmission and transmitted color.

The window assembly 10 also comprises a polymeric interlayer 28 provided between the inner pane of glass 16 and the outer pane of glass 22. The polymeric interlayer 28 is not limited to a particular thickness. However, in certain embodiments, the polymeric interlayer 28 has a thickness of between 0.3 and 1.8 mm, preferably, between 0.5 and 1.6 mm. More preferably, the polymeric interlayer 28 has a thickness of between 0.6 and 0.9 mm. In one such embodiment, the thickness of the polymeric interlayer 28 is 0.76 mm.

The polymeric interlayer 28 may comprise a first major surface and a second major surface. In certain embodiments, the polymeric interlayer 28 is provided as a polymer sheet in a shape substantially matched to that of the inner pane of glass 16 and/or outer pane of glass 22. As illustrated in FIG. 3, the first major surface and the second major surface of the polymeric interlayer 28 may be provided in a parallel relationship with each other. In other embodiments, such as, for example, when the window assembly 10 is utilized in a heads-up display application, the first major surface and the second major surface of the polymeric interlayer 28 may not be provided in a parallel relationship with each other. In these embodiments, the first major surface or the second major surface of the polymeric interlayer 28 may be positioned in such a manner that one surface positioned oblique to the other. In another embodiment, the polymeric interlayer 28 may be of a generally triangular or of a wedge shape.

Preferably, the polymeric interlayer 28 is clear and substantially transparent to visible light. Optionally, the polymeric interlayer 28 can be tinted and/or comprise an IR reflective film to provide additional solar control features. However, an advantage of the window assembly 10 is that it can exhibit the desired solar properties and visible light transmittance without being tinted or requiring an IR reflective film, which reduces the cost of the window assembly 10 compared with prior art designs. The polymeric interlayer 28 is of or includes a suitable polymer such as, for example, polyvinyl butyral (PVB) or another suitable material like PVC, EVA, EMA, and polyurethane.

The polymeric interlayer may have improved sound reducing properties, for example the polymeric interlayer may comprise acoustic modified PVB.

To form the window assembly 10, the inner pane of glass 16 and the outer pane of glass 22 are laminated to each other or are otherwise adhered together via the polymeric interlayer 28. Lamination processes known in the art are suitable for adhering the inner pane of glass 16 to the outer pane of glass 22 via the polymeric interlayer 28 and forming the window assembly 10. Generally, such lamination processes will include inserting the polymeric interlayer 28 between the inner pane of glass 16 and the outer pane of glass 22 and subjecting the interlayer and panes to a predetermined temperature and pressure to create a laminated window assembly 10.

Once the window assembly 10 has been formed, it is preferred that the window assembly 10 has a thickness of less than 5.0 mm. In certain embodiments, the thickness of the window assembly 10 may be 4.0 mm or less. In other embodiments, the thickness of the window assembly 10 may be less than 3.0 mm. For these embodiments, the window assembly may have a thickness of at least 2.0 mm.

The transmitted color exhibited by the window assembly 10 is an advantageous feature. For the purpose of describing the embodiments of the window assembly 10, the transmitted color exhibited by the window assembly will refer to the visible light transmitted through the window assembly measured at a 90 degree angle incident from the assembly and be described in association with the CIELAB color scale system using Illuminant D65, 10 degree observer. Preferably, the window assembly 10 exhibits a transmitted color that is green. In these embodiments, the window assembly 10 exhibits an $a^*$ value of −12 to −5 according to the CIELAB color scale system (Illuminant D65, ten degree observer). In some embodiments, the window assembly 10 exhibits an $a^*$ value of −12 to −6, preferably −11 to −6, according to the CIELAB color scale system (Illuminant D65, ten degree observer). The window assembly 10 may also exhibit a $b^*$ value of −2 to 6 in transmission according to the CIELAB color scale system (Illuminant D65, ten degree observer). In certain embodiments, the window assembly 10 exhibits a transmitted color that is green-yellow. In these embodiments, the window assembly 10 exhibits a $b^*$ value of 0 to 6, preferably 2 to 6, in transmission according to the CIELAB color scale system (Illuminant D65, ten degree observer). Also, the lightness ($L^*$) exhibited by the window assembly will be described in association with the CIELAB color scale system using Illuminant D65, 10 degree observer. It is preferred that the window assembly 10 exhibits an $L^*$ of 88 or more in the CIELAB color scale system (Illuminant D65, ten degree observer).

The window assembly 10 also exhibits other advantageous properties. For example, the window assembly 10 may exhibit a low direct solar transmittance. As used herein, direct solar transmittance (TDS) refers to solar transmittance integrated over the wavelength range 300 to 2500 nm according to the relative solar spectral distribution for air mass 1.5. The direct solar transmittance may be determined according to a recognized standard such as ISO 13837:2008 convention A. In certain embodiments, the window assembly 10 exhibits a direct solar transmittance of 55% or less. In one such embodiment, the window assembly 10 may exhibit a direct solar transmittance of 40-55%. In some embodiments, the window assembly 10 exhibits a direct solar transmittance of 52% or less. Preferably, the window assembly 10 exhibits a direct solar transmittance of 50% or less. In certain embodiments, the window assembly 10 may exhibit a direct solar transmittance of 45% or less. In these embodiments, the window assembly 10 may exhibit a direct solar transmittance of at least 40%.

The window assembly 10 may exhibit a low total solar transmittance. As used herein, total solar transmittance (TTS) is defined as including solar energy transmitted directly through the window assembly and the solar energy absorbed by the assembly, and subsequently convected and thermally radiated inwardly integrated over the wavelength range 300 to 2500 nm according to the relative solar spectral distribution for air mass 1.5. The total solar transmittance may be determined according to a recognized standard such as ISO 13837:2008 convention A and at a wind speed of 14 kilometers per hour. In certain embodiments, the window assembly 10 exhibits a total solar transmittance of 65% or less. In one such embodiment, the window assembly 10 exhibits a total solar transmittance of 55-65%. In other embodiments, the window assembly 10 exhibits a total solar transmittance of 62% or less. Preferably, the window assembly 10 exhibits a total solar transmittance of 60% or less. In these embodiments, the window assembly 10 may exhibit a total solar transmittance of at least 55%.

The embodiments of the window assembly 10 may also exhibit an advantageous total visible light transmittance. For example, when the window assembly 10 is utilized as a glazing in a vehicle 12, the total visible light transmittance exhibited by the assembly 10 improves the visual comfort of the passengers by providing a reasonable amount of visible light transmittance into the passenger compartment of the vehicle 12. For describing the window assembly 10, total visible light transmittance will refer to the percentage of visible light passing through the assembly as measured from a side facing the inner pane of glass and in association with the CIELAB color scale system using Illuminant A, two degree observer. In the embodiments described above, it is preferred that the window assembly 10 has a total visible light transmittance of 70% or more in the CIELAB color scale system (Illuminant A, two degree observer). In certain embodiments, the window assembly 10 has a total visible light transmittance of 75% or more in the CIELAB color scale system (Illuminant A, two degree observer). In some embodiments, the window assembly 10 has a total visible light transmittance of 70-80% in the CIELAB color scale system (Illuminant A, two degree observer). However, depending on the application or location of the window assembly 10 in a vehicle, the window assembly 10 may exhibit a total visible light transmittance of less than 70%. For example, when the window assembly 10 is utilized as a back lite, rear side lite, or roof lite, the window assembly 10 may exhibit a total visible light transmittance of less than 70% in the CIELAB color scale system (Illuminant A, two degree observer). In some of these embodiments, the window assembly 10 may exhibit a total visible light transmittance of less than 50% in the CIELAB color scale system (Illuminant A, two degree observer). Preferably, when the window assembly 10 is utilized as a back lite or a rear side lite, the window assembly 10 may exhibit a total visible light transmittance of 30% or less in the CIELAB color scale system (Illuminant A, two degree observer). When the window assembly 10 is utilized as a roof lite, the window assembly 10 may exhibit a total visible light transmittance of 20% or less, and more preferably 10% or less in the CIELAB color scale system (Illuminant A, two degree observer).

Examples

The following examples are presented solely for the purpose of further illustrating and disclosing the embodiments of the window assembly. The examples, Ex 1-Ex 3, of the window assembly described below are predictive and exhibit the properties listed in the TABLE.

The window assemblies of Ex 1-Ex 3 each include an inner pane of glass. For Ex 1, the inner pane of glass has a soda-lime-silica composition like the one described above and a thickness of 0.5 mm. For both Ex 2 and Ex 3, the inner pane of glass has a soda-lime-silica composition like the one described above and a thickness of 0.7 mm. For Ex 1-Ex 3, the inner pane of glass is clear and may be formed by a float glass manufacturing process or another process. The sheet of glass used for each inner pane would be chemically strengthened using, for example, a molten salt as described above.

A colored outer pane of glass was also provided for each of Ex 1-Ex 3. The outer panes of glass had a soda-lime-silica composition. For Ex 1, the composition comprised 72 weight % $SiO_2$, 3.9 weight % MgO, 7.0 weight % CaO, 14 weight % $Na_2O$, 0.5 weight % $K_2O$, 7.5 weight % CaO, and 1.1 weight % $Al_2O_3$. For Ex 2 and Ex 3, the composition comprised 72 weight % $SiO_2$, 3.9 weight % MgO, 7.5 weight % CaO, 14 weight % $Na_2O$, 0.5 weight % $K_2O$, 7.5 weight % CaO, and 1.1 weight % $Al_2O_3$. For Ex 1, the outer pane of glass also comprised 1.8 weight % $Fe_2O_3$ (total iron). For Ex 2, the outer pane of glass also comprised 1.3 weight % $Fe_2O_3$ (total iron). For Ex 3, the outer pane of glass comprised 1.3 weight % $Fe_2O_3$ (total iron). For Ex 1-Ex 3, the total iron was 28% ferrous iron calculated as $Fe_2O_3$. For the avoidance of doubt, in Ex 3 where the total iron content of the outer pane is 1.3 weight % $Fe_2O_3$ at a ferrous content of 28% ferrous iron calculated as $Fe_2O_3$ the content of ferrous iron expressed as $Fe_2O_3$ is ($1.3 \times 28/100 =$) is 0.364 weight %.

The outer pane of Ex 1 has a thickness of 1.3 mm, the outer pane of Ex 2 has a thickness of 1.8 mm, and the outer pane of Ex 3 has a thickness of 2.1 mm. Preferably, the outer panes of glass are formed by a float glass manufacturing process and are each is provided as a sheet of glass.

Each outer pane of glass is laminated to an inner pane of glass utilizing a clear polymeric interlayer as described above. For each of Ex 1-Ex 3, the interlayer was of PVB composition, 0.76 mm in thickness, and substantially transparent to visible light.

The total visible light transmittance (Tvis), transmitted color (Ta*, Tb*), lightness (L*), direct solar energy transmittance (TDS), and the total solar transmittance (TTS) of the window assemblies of Ex 1-Ex 3 are reported in the TABLE. For each example, the total visible light transmittance was calculated by optical modeling and according to the CIELAB color scale system using illuminant A, two degree observer. The transmitted color and lightness reported in the TABLE were calculated by optical modeling and according to the CIELAB color scale system using illuminant D65, ten degree observer. The direct solar transmittance was calculated by optical modeling and determined according to ISO 13837:2008 convention A. The total solar transmittance was also calculated by optical modeling and determined according to ISO 13837:2008 convention A at a wind speed of 14 kilometers per hour. The total visible light transmittance, direct solar transmittance, and total solar transmittance reported below are expressed as percentages.

TABLE

| Example | Tvis | Ta* | Tb* | L* | TDS | TTS |
|---|---|---|---|---|---|---|
| Ex 1 | 75.0 | −5.9 | 4.1 | 89.8 | 49.7 | 61.9 |
| Ex 2 | 75.2 | −6.3 | 2.7 | 90.0 | 48.5 | 61.0 |
| Ex 3 | 72.8 | −7.2 | 3.0 | 89.0 | 44.9 | 58.5 |

As shown in the TABLE, the embodiments of the window assembly illustrated by Ex 1-Ex 3 exhibit a transmitted color which is green-yellow as each exhibits an a* value of between −12 and −5 and a b* value of between 2 and 6 according to the CIELAB color scale system (Illuminant D65, ten degree observer). Also, the window assemblies illustrated by Ex 1-Ex 3 exhibit a high total visible light transmittance. For example, the window assemblies of Ex 1-Ex 3 each exhibit a visible light transmittance of transmission of 70% or more (Illuminant A, two degree observer). In fact, the window assemblies of Ex 1 and Ex 2 each exhibit a visible light transmittance of 75% or more (Illuminant A, two degree observer). Also, the window assemblies of Ex 1-Ex 3 exhibit direct solar transmittances of less than 55%. Moreover, the window assemblies of Ex 1-Ex 3 exhibit direct solar transmittances of less than 50%. Additionally, the window assemblies of Ex 1-Ex 3 exhibit total solar transmittances of less than 65%. Furthermore, the window assembly of Ex 3 exhibited a total solar transmittance of less than 60%.

The present invention therefore provides a window assembly including a first pane of glass. The first pane of glass is chemically strengthened and exhibits a surface compressive stress of 400 MPa or more. A second pane of glass of the window assembly has a first major surface and a second major surface. The second major surface of the second pane of glass and a first major surface of the first pane of glass face each other. The second pane of glass includes 68-74 weight % $SiO_2$, 2-6 weight % MgO, 1-10 weight % CaO, 12-16 weight % $Na_2O$, 0-1 weight % $K_2O$, 0.8-2.0 weight % $Fe_2O_3$ (total iron), 0-1.25 weight % $TiO_2$, and 0-1.25 weight % $CeO_2$. A polymeric interlayer is provided between the first pane of glass and the second pane of glass. The window assembly exhibits a direct solar transmittance of 55% or less and a total solar transmittance of 65% or less.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

What is claimed is:

1. A window assembly, comprising:
   a first pane of glass, the first pane of glass being chemically strengthened and exhibiting a surface compressive stress of 400 MPa or more and a Vickers hardness of 550 kgf/mm$^2$ or more;
   a second pane of glass having a first major surface and a second major surface, wherein the second major surface of the second pane of glass and a first major surface of the first pane of glass face each other, the second pane of glass comprising 68-74 weight % $SiO_2$, 2-6 weight % MgO, 1-10 weight % CaO, 12-16 weight % $Na_2O$, 0-1 weight % $K_2O$, 0.8-2.0 weight % $Fe_2O_3$ (total iron) wherein 20-30% of the total iron is ferrous iron calculated as $Fe_2O_3$, 0-1.25 weight % $TiO_2$, and 0-1.25 weight % $CeO_2$; and
   a polymeric interlayer provided between the first pane of glass and the second pane of glass,
   wherein the window assembly exhibits a direct solar transmittance, integrated over the wavelength range 300 to 2500 nm according to the relative solar spectral distribution for air mass 1.5, of 55% or less and a total solar transmittance, integrated over the wavelength range 300 to 2500 nm according to the relative solar spectral distribution for air mass 1.5, of 65% or less.

2. The window assembly of claim 1, wherein the window assembly exhibits a total visible light transmittance (Illuminant A, two degree observer) of 70% or more as measured from a side facing the first pane of glass.

3. The window assembly of claim 1, wherein the transmitted color (Illuminant D65, ten degree observer) exhibited by the window assembly has an a* value of −12 to −5 and a b* value of 0 to 6.

4. The window assembly of claim 1, wherein the second pane of glass comprises 0.8-1.9 weight % $Fe_2O_3$ (total iron), or 0.9-1.9 weight % $Fe_2O_3$ (total iron) or 0.9-1.4 weight % $Fe_2O_3$ (total iron).

5. The window assembly of claim 1, wherein the thickness of the second pane of glass is greater than the thickness of the first pane of glass.

6. The window assembly of claim 1, wherein the first pane of glass exhibits a surface compressive stress of 400 MPa or more and 800 MPa or less, and has a compressive stress layer with a depth of 15 to 40 microns.

7. The window assembly of claim 1, wherein the weight % of $Al_2O_3$ in the second pane of glass is less than the weight % of $Al_2O_3$ in the first pane of glass and/or wherein the second pane of glass comprises 0-2 weight % $Al_2O_3$.

8. The window assembly of claim 1, wherein the first pane of glass comprises 66-72 weight % $SiO_2$, 8-15 weight % MgO, 1-8 weight % CaO, 12-16 weight % $Na_2O$, 0-1 weight % $K_2O$, and 1.0-5.0 weight % $Al_2O_3$.

9. The window assembly of claim 8, wherein the first pane of glass comprises 4.0-5.0 weight % $Al_2O_3$.

10. The window assembly of claim 1, wherein the first pane of glass comprises 58-70 weight % $SiO_2$, 4-10 weight % MgO, 0-1 weight % CaO, 12-18 weight % $Na_2O$, 0.1-5 weight % $K_2O$, and 5-15 weight % $Al_2O_3$.

11. The window assembly of claim 1, wherein the first pane of glass is an inner pane of glass and the second pane of glass is an outer pane of glass.

12. The window assembly of claim 1, wherein the first pane of glass is a sheet of float glass and the second pane of glass is a sheet of float glass.

13. The window assembly of claim 1, wherein the window assembly exhibits a direct solar transmittance of 52% or less and a total solar transmittance of 62% or less.

14. The window assembly of claim 1, wherein the window assembly exhibits a direct solar transmittance of 40-55% and/or wherein the window assembly exhibits a total solar transmittance of 55-65%.

15. The window assembly of claim 1, wherein the thickness of the second pane of glass is greater than the thickness of the first pane of glass, wherein the thickness of the second pane of glass is 4 mm or less and the thickness of the first pane of glass is 2 mm or less, and wherein the thickness of the window assembly is between 2.0 mm and 5.0 mm.

16. A window assembly, comprising:
   a first pane of glass, the first pane of glass being chemically strengthened and exhibiting a surface compressive stress of 400 MPa or more;
   a second pane of glass having a first major surface and a second major surface, wherein the second major surface of the second pane of glass and a first major surface of the first pane of glass face each other, the second pane of glass comprising 68-74 weight % $SiO_2$, 2-6 weight % MgO, 1-10 weight % CaO, 12-16 weight % $Na_2O$, 0-1 weight % $K_2O$, 0.8-2.0 weight % $Fe_2O_3$ (total iron) wherein 20-30% of the total iron is ferrous iron calculated as $Fe_2O_3$, 0-1.25 weight % $TiO_2$, and 0-1.25 weight % $CeO_2$; and
   a polymeric interlayer provided between the first pane of glass and the second pane of glass, wherein the window assembly exhibits a direct solar transmittance, integrated over the wavelength range 300 to 2500 nm according to the relative solar spectral distribution for air mass 1.5, of 55% or less and a total solar transmittance, integrated over the wavelength range 300 to 2500 nm according to the relative solar spectral distribution for air mass 1.5, of 65% or less.

17. The window assembly of claim 16, wherein the first pane of glass exhibits a surface compressive stress of 400 MPa or more and 800 MPa or less, and has a compressive stress layer with a depth of 15 to 40 microns.

18. The window assembly of claim 16, wherein the transmitted color (Illuminant D65, ten degree observer) exhibited by the window assembly has an a* value of −12 to −5 and/or wherein the transmitted color (Illuminant D65, ten degree observer) exhibited by the window assembly has a b* value of −2 to 6.

19. The window assembly of claim 16, wherein the lightness (Illuminant D65, ten degree observer) exhibited by the window assembly has an L* of 88% or more.

20. The window assembly of claim 16, wherein the thickness of the second pane of glass is greater than the thickness of the first pane of glass, wherein the thickness of the second pane of glass is 4 mm or less and the thickness of the first pane of glass is 2 mm or less, and wherein the thickness of the window assembly is between 2.0 mm and 5.0 mm.

* * * * *